US006509656B2

(12) United States Patent
Penzenstadler et al.

(10) Patent No.: US 6,509,656 B2
(45) Date of Patent: Jan. 21, 2003

(54) DUAL MAGNETRONS POWERED BY A SINGLE POWER SUPPLY

(75) Inventors: Ernest G. Penzenstadler, Herndon, VA (US); Jonathan D. Barry, Frederick, MD (US); Gregory H. Owen, Gaithersburg, MD (US)

(73) Assignee: Fusion UV Systems, Gaithersburg, MD (US)

(*) Notice: Subject to any disclaimer, the term of this patent is extended or adjusted under 35 U.S.C. 154(b) by 0 days.

(21) Appl. No.: 09/852,015

(22) Filed: May 10, 2001

(65) Prior Publication Data

US 2002/0084695 A1 Jul. 4, 2002

Related U.S. Application Data

(60) Provisional application No. 60/259,181, filed on Jan. 3, 2001.

(51) Int. Cl.[7] .................................................. H02H 1/00

(52) U.S. Cl. ............................. 307/31; 307/33; 307/34; 219/678; 219/702

(58) Field of Search ............................. 307/31, 33, 34; 219/678, 702

(56) References Cited

U.S. PATENT DOCUMENTS 2,543,887 A 3/1951 Brown et al.
2,605,383 A 7/1952 Spencer
2,609,497 A 9/1952 Dawson et al.
3,104,303 A 9/1963 Crapuchettes
3,104,305 A 9/1963 Crapuchettes
3,619,536 A 11/1971 Boehm
4,001,536 A 1/1977 Eberhardt, Jr.
4,294,858 A 10/1981 Moule
4,348,572 A 9/1982 Moule
4,868,509 A 9/1989 Ury et al.
4,939,330 A * 7/1990 Berggren et al. ..... 219/10.55 B
4,939,331 A 7/1990 Berggren et al.
4,980,610 A 12/1990 Varga
5,180,895 A 1/1993 Briggs et al.
5,338,422 A 8/1994 Belkind et al.
5,451,751 A 9/1995 Takimoto et al.
5,571,439 A 11/1996 Daley et al.
5,777,863 A 7/1998 Kowalevskii et al.
5,818,014 A 10/1998 Smith et al.
6,084,760 A 7/2000 Nomura

FOREIGN PATENT DOCUMENTS

DE 42 38 198 5/1994
DE 42 38 199 5/1994
JP 6-188085 7/1994

* cited by examiner

*Primary Examiner*—Stephen W. Jackson
*Assistant Examiner*—Robert L. Deberadinis
(74) *Attorney, Agent, or Firm*—Antonelli, Terry, Stout & Kraus, LLP

(57) ABSTRACT

A system and method are provided to power two magnetrons devices. The system may include a power supply device to power a first magnetron device and a second magnetron device. A control device may control an amount of current reaching at least the first magnetron device.

31 Claims, 2 Drawing Sheets

DUAL MAGNETRONS POWERED BY A SINGLE POWER SUPPLY

This Application claims priority from U.S. Provisional Application No. 60/259,181, filed Jan. 3, 2001, the subject matter of which is incorporated herein by reference.

FIELD OF THE INVENTION

The present invention relates to a system utilizing and/or controlling a plurality of magnetrons that are powered by a single power supply.

DESCRIPTION OF RELATED ART

Microwave heating is a technique that can be applied with great advantage in a multiple of processes which include the supply of thermal energy. One advantage is that the heating power can be controlled in the absence of any inertia.

One drawback, however, is that microwave equipment is often more expensive than conventional alternatives. A magnetron of such heating equipment may be driven by a power unit with associated control system, which constitute the major cost of the equipment. Since the output power of the magnetron is limited, heating equipment may require the presence of a significant number of magnetrons and associated power units and control systems to achieve a given heating requirement.

Magnetrons may be used to generate radio frequency (RF) energy. This RF energy may be used for different purposes such as heating items (i.e., microwave heating) or it may be used to generate a plasma. The plasma, in turn, may be used in many different processes, such as thin film deposition, diamond deposition and semiconductor fabrication processes. The RF energy may also be used to create a plasma inside a quartz envelope that generates UV (or visible) light. Those properties decisive in this regard are the high efficiency achieved in converting d.c. power to RF energy and the geometry of the magnetron. One drawback is that the voltage required to produce a given power output varies from magnetron to magnetron. This voltage may be determined predominantly by the internal geometry of the magnetron and the magnetic field strength in the cavity.

Some applications may require two magnetrons to provide the required RF energy. In these situations, an individual power source has been required for each magnetron. Two or more magnetrons may be coupled to a power supply in parallel. However, two magnetrons of identical design may not have identical voltage versus current characteristics. Normal manufacturing tolerance and temperature differences between two identical magnetrons may yield different voltage versus current characteristics. As such, each magnetron may have a slightly different voltage. For example, the magnetrons may have mutually different operating curves such that one magnetron may produce a higher power output than the other magnetron. The magnetron having the higher output power may become hotter than the other, wherewith the operating curve falls and the power supply will be clamped or limited to a lower output voltage. This may cause the power output of the magnetron producing the higher output to fall further until only one magnetron produces all the power due to the failure to reach the knee voltage of the other magnetron. It is desirable to utilize a plurality of magnetrons without these problems.

SUMMARY OF THE INVENTION

To achieve these and other objects, embodiments of the present invention may provide a system that includes a power supply device to supply a current, a first magnetron device to be powered by the power supply device, a second magnetron device to be powered by the power supply device and a control circuit to control an amount of current reaching the first magnetron device.

The control circuit may control an amount of current reaching the first magnetron device and an amount of current reaching the second magnetron device.

The control circuit may include a hall effect current transformer coupled between the power supply device and each of the first magnetron device and the second magnetron device. The hall effect current transformer may sense current through two signal lines and adjust a current to at least the first magnetron device such that the first magnetron device and the second magnetron device both receive substantially equal current.

The control circuit may further include a first electromagnet associated with the first magnetron device. The first electromagnet may operate in conjunction with the hall effect current transformer to adjust the current reaching the first magnetron device. The control circuit may also include a second electromagnet associated with the second magnetron device.

The control circuit may include an error amplifier coupled between the hall effect current transformer and the first electromagnet. The control circuit may also include a coil driver device coupled between the hall effect current transformer and the first electromagnet.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Embodiments of the present invention may provide a system incorporating a solid state power supply and control apparatus to operate two or more magnetrons. In particular, embodiments of the present invention may allow two or more magnetrons to be powered by a single (i.e., common) power supply.

Figure 1:
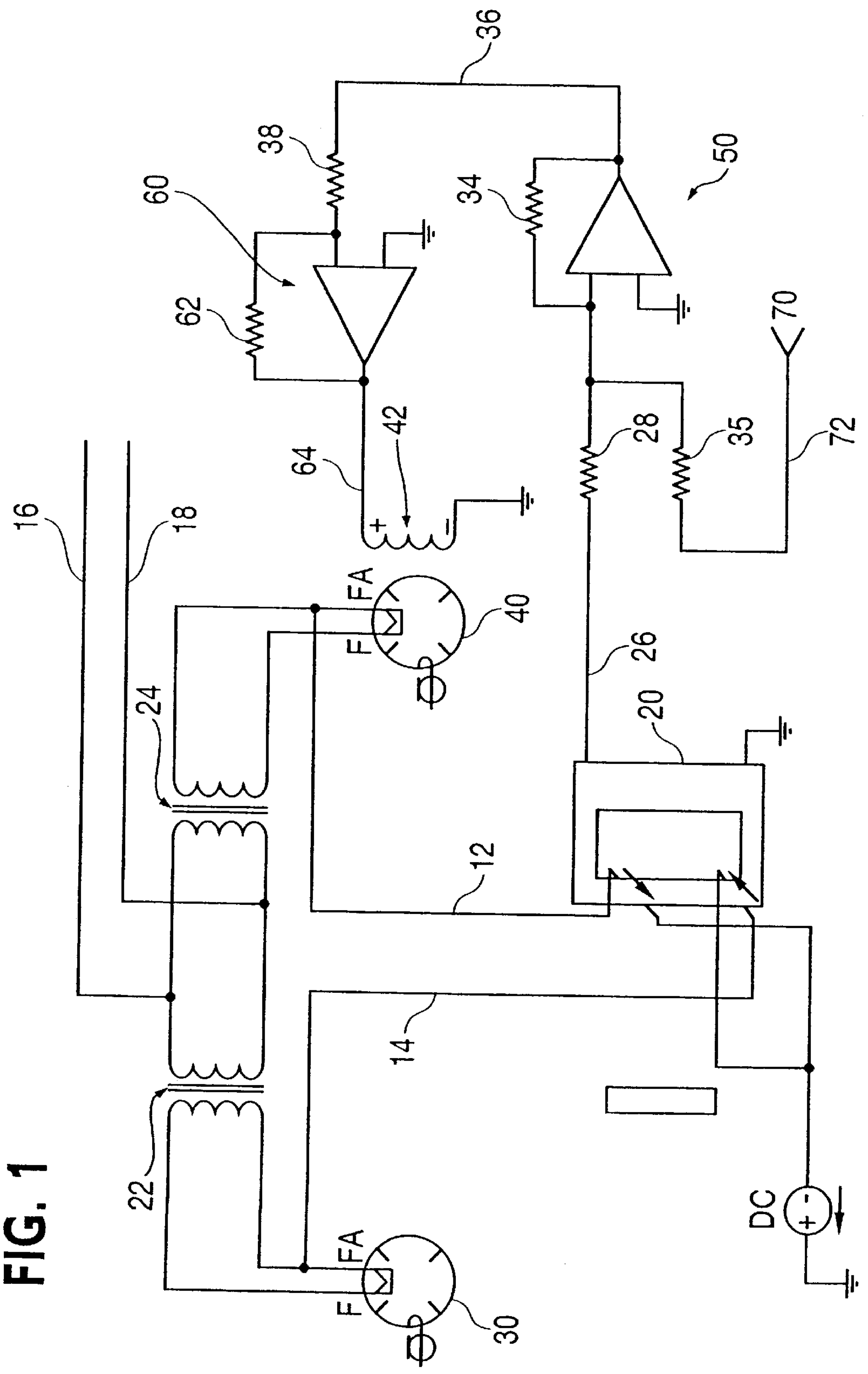
FIG. 1 is a circuit diagram of an example embodiment of the present invention.

FIG. 1 is a circuit diagram for powering two magnetrons (or two magnetron devices) from a single power supply according to an example embodiment of the present invention. Other embodiments and configurations are also within the scope of the present invention. In particular, FIG. 1 shows a power supply 10 such as a high-voltage low ripple d.c. power supply. More specifically, the power supply 10 may include a solid state high voltage power supply capable of 1.68 amp output at 4.6 KV. The power supply 10 may be designed to provide a constant current output (or approximately constant current). Other amounts of current and power are also within the scope of the present invention. The power supply 10 may be coupled to a hall effect current transformer 20 such that a first signal line 12 wraps around the hall effect current transformer 20 in a first direction (i.e., clockwise) and a second signal line 14 wraps around the hall effect current transformer 20 in a second direction (i.e., counterclockwise) opposite to the first direction. As will be described below, the hall effect current transformer 20 acts to sense the current through the lines 12 and 14 and adjust the current to one of the magnetrons such that both magnetrons have equal current (or substantially equal current). Stated differently, the power supply 10 supplies a constant current output that is sensed by the hall effect current transformer 20. As is known in the art, a hall effect current sensor (such as the hall effect current transformer 20) utilizes the Hall effect to sense the magnetic field and output a proportional voltage. The output of the hall effect current transformer 20 is proportional to the difference in current between lines 12 and 14.

The signal line 12 may be coupled to the cathode of a magnetron 40 and the signal line 14 may be further coupled to the cathode of a magnetron 30 as shown in FIG. 1. In this embodiment, the filaments are coupled to a transformer that provides the necessary current for filament heating. The primaries of the filament transformers 22 and 24 may be powered from an AC source (such as 100 to 200 volts) across the signal lines 16 and 18. The cathode terminal may also be shared with one of the filament terminals. This may be specific to this embodiment as other embodiments may have similar or different connections.

In the FIG. 1 embodiment, a feedback loop may be utilized to adjust the current in the magnetron 40. More specifically, the hall effect current transformer 20 may be coupled by signal line 26 to a resistor 28 and to an error amplifier 50 which may include a resistor 34 coupled between its input and output. The output of the error amplifier 50 may be coupled along a signal line 36 to a resistor 38 which in turn may be coupled to an input of a coil driver 60 which may include a resistor 62 coupled between its input and output. The configuration and operation of the error amplifier 50, the coil driver 60 and the resistors 28, 34 and 38 are merely one example of providing these respective functions. Other combinations and configurations of resistors and amplifiers are also within the scope of the present invention. The output of the coil driver 60 may be applied along a signal line 64 to a start terminal of an electromagnet 42 associated with the magnetron 40. A finish terminal of the electromagnet 42 may be coupled to ground as shown in FIG. 1.

A modulation input 70 may be applied along signal line 72 and through a resistor 35 to an input of the error amplifier 50. The input 70 allows the current (power) distribution between the magnetrons to be a time varying function. This simulates the magnetrons being operated from a conventional rectified unfiltered power supply. Some types of ultraviolet (UV) bulbs may benefit from this type of operation.

Figure 2:
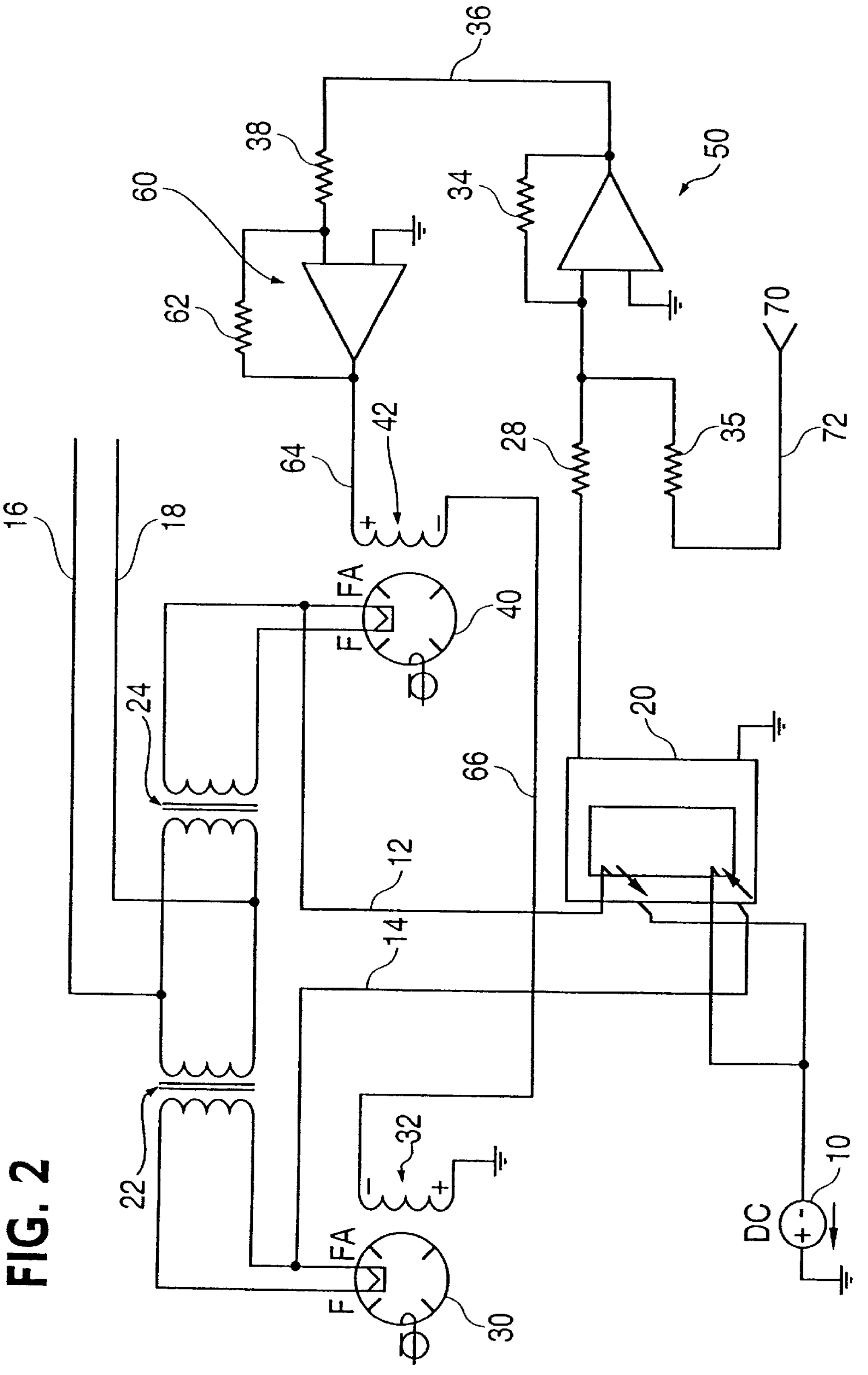
FIG. 2 is a circuit diagram of another example embodiment of the present invention.

FIG. 2 is a circuit diagram of another example embodiment of the present invention that utilizes a single power supply 10 and two magnetrons 30 and 40. Other embodiments and configurations are also within the scope of the present invention. This embodiment is similar to the FIG. 1 embodiment and additionally includes a signal line 66 that couples the finish terminal of the electromagnet 42 to a finish terminal of an electromagnet 32 associated with the magnetron 30. A start terminal of the electromagnet 32 may be coupled to ground as shown in FIG. 2. This type of connection provides an increasing magnetic field in the magnetron 40 and a decreasing magnetic field in the magnetron 30 for a given current direction. In this embodiment, the feedback may be utilized to adjust the current in the magnetrons 30 and 40.

The power supply 10 may be designed to provide a constant current where the output current will be shared by the two magnetrons 30 and 40. Sharing of the current may be made possible by utilizing the hall effect current transformer 20. The hall effect current transformer 20 may sense current in the lines 12 and 14 and operate to monitor the anode current to each of the magnetrons 30 and 40 and adjust the electromagnet current such that both the magnetrons 30 and 40 have equal currents. This may be accomplished by having the output of the hall effect current transformer 20 be forced to zero by using the feedback loop described above which includes the error amplifier 50 and the coil driver 60. The circuit may provide current mirroring for the magnetrons 30 and 40. Additionally, the use of the electromagnet 42 and the electromagnet 32 in the FIG. 2 embodiment allows the magnetic flux to be increased in one of the magnetrons while the magnetic flux is decreased in the other magnetron.

In summary, embodiments of the present invention may provide a system having a single power supply device that supplies power to at least two magnetrons. This may be accomplished by sensing the current applied to the anode of each magnetron 30 and 40 using a hall effect current transformer 20 as shown in the figures. This scheme may be adapted to a system or process having more than one magnetron.

While the invention has been described with reference to specific embodiments, the description of the specific embodiments is illustrative only and is not to be considered as limiting the scope of the invention. That is, various other modifications and changes may occur to those skilled in the art without departing from the spirit and the scope of the invention.

What is claimed:

1. A system comprising:

a power supply device to supply a current;

a first magnetron device to be powered by the power supply device;

a second magnetron device to be powered by the power supply device; and a control circuit to apportion an amount of current to each of said first magnetron device and said second magnetron device.

2. The system of claim 1, wherein said control circuit controls said amount of current reaching said first magnetron device and an amount of current reaching said second magnetron device.

3. The system of claim 1, wherein said power supply device supplies an approximately constant current.

4. The system of claim 1, wherein said control circuit comprises a hall effect current transformer coupled between said power supply device and each of said first magnetron device and said second magnetron device.

5. The system of claim 4, wherein said hall effect current transformer senses current through two signal lines and adjusts a current to at least said first magnetron device such that said first magnetron device and said second magnetron device both receive substantially equal current.

6. The system of claim 4, wherein said control circuit further comprises a first electromagnet associated with said first magnetron device.

7. The system of claim 6, wherein said first electromagnet operates in conjunction with said hall effect current transformer to adjust said current reaching said first magnetron device.

8. The system of claim 6, wherein said control circuit further comprises a second electromagnet associated with said second magnetron device.

9. The system of claim 6, wherein said control circuit further comprises an error amplifier coupled between said hall effect current transformer and said first electromagnet.

10. The system of claim 6, wherein said control circuit further comprises a coil driver device coupled between said hall effect current transformer and said first electromagnet.

11. The system of claim 1, wherein said control circuit apportions said current such that said first magnetron device receives substantially equal current as said second magnetron device.

12. A system to power a first magnetron device and a second magnetron device, the system comprising:

a power supply device to power said first magnetron device and said second magnetron device; and control means for apportioning an amount of current to each of said first magnetron device and said second magnetron device.

13. The system of claim 12, wherein said power supply device supplies an approximately constant current.

14. The system of claim 12, wherein said control means comprises a hall effect current transformer coupled between said power supply device and each of said first magnetron device and said second magnetron device.

15. The system of claim 14, wherein said hall effect current transformer senses current through two signal lines and adjusts a current to at least said first magnetron device such that said first magnetron device and said second magnetron device both receive substantially equal current.

16. The system of claim 14, wherein said control means further comprises a first electromagnet associated with said first magnetron device.

17. The system of claim 16, wherein said first electromagnet operates in conjunction with said hall effect current transformer to adjust said current reaching said first magnetron device.

18. The system of claim 16, wherein said control means further comprises a second electromagnet associated with said second magnetron device.

19. The system of claim 16, wherein said control means further comprises an error amplifier coupled between said hall effect current transformer and said first electromagnet.

20. The system of claim 16, wherein said control means further comprises a coil driver device coupled between said hall effect current transformer and said first electromagnet.

21. The system of claim 12, wherein said control means controls said amount of current reaching said first magnetron device and an amount of current reaching said second magnetron device.

22. The system of claim 12, wherein said control circuit apportions said current such that said first magnetron device receives substantially equal current as said second magnetron device.

23. A method of powering a system having a first magnetron device and a second magnetron device, said method comprising:

providing a first current along a first signal line to said first magnetron device;

providing a second current along a second signal line to said second magnetron device; and apportioning said first current to said first magnetron device and said second current to said second magnetron device.

24. The method of claim 23, wherein said apportioning comprises sensing said first current and said second current and adjusting said first current to at least said first magnetron device such that said first magnetron device and said second magnetron device both receive substantially equal current.

25. The method of claim 23, wherein said apportioning comprises adjusting said second current to said second magnetron device.

26. A system comprising:

a power supply device to supply a current;

a first magnetron device to be powered by the power supply device;

a second magnetron device to be powered by the power supply device; and a control circuit to control a n amount of current reaching said first magnetron device, said control circuit comprising a hall effect current transformer coupled between said power supply device and each of said first magnetron device and said second magnetron device.

27. The system of claim 26, wherein said hall effect current transformer senses current through two signal lines and adjusts the current to at least said first magnetron device such that said first magnetron device and said second magnetron device both receive substantially equal current.

28. A system to power a first magnetron device and a second magnetron device, the system comprising:

a power supply device to power said first magnetron device and said second magnetron device; and control means for controlling an amount of current reaching said first magnetron device, said control circuit comprising a hall effect current transformer coupled between said power supply device and each of said first magnetron device and said second magnetron device.

29. The system of claim 28, wherein said hall effect current transformer senses current through two signal lines and adjusts the current to at least said first magnetron device such that said first magnetron device and said second magnetron device both receive substantially equal current.

30. A method of powering a system having a first magnetron device and a second magnetron device, said method comprising:

providing a first current along a first signal line to said first magnetron device;

providing a second current along a second signal line to said second magnetron device; and adjusting said first current to said first magnetron device, wherein said adjusting comprises sensing said first current and said second current and adjusting said first current to at least said first magnetron device such that said first magnetron device and said second magnetron device both receive substantially equal current.

31. The method of claim 30, wherein said hall effect current transformer senses current through two signal lines and adjusts the first current to at least said first magnetron device such that said first magnetron device and said second magnetron device both receive substantially equal current.

* * * * *